(12) United States Patent
Darling et al.

(10) Patent No.: US 7,645,531 B2
(45) Date of Patent: Jan. 12, 2010

(54) RETAINING WATER IN A FUEL CELL STACK FOR COOLING AND HUMIDIFICATION DURING FROZEN STARTUP

(75) Inventors: Robert M. Darling, South Windsor, CT (US); Craig E. Evans, Vernon, CT (US); Carl A. Reiser, Stonington, CT (US); Tommy Skiba, East Hartford, CT (US); Ryan J. Balliet, West Hartford, CT (US)

(73) Assignee: UTC Power Corporation, South Windsor, CT (US)

( * ) Notice: Subject to any disclaimer, the term of this patent is extended or adjusted under 35 U.S.C. 154(b) by 73 days.

(21) Appl. No.: 11/918,624

(22) PCT Filed: Apr. 15, 2005

(86) PCT No.: PCT/US2005/013040

§ 371 (c)(1),
(2), (4) Date: Oct. 15, 2007

(87) PCT Pub. No.: WO2006/112833

PCT Pub. Date: Oct. 26, 2006

(65) Prior Publication Data

US 2009/0061262 A1    Mar. 5, 2009

(51) Int. Cl.
*H01M 8/04*    (2006.01)
(52) U.S. Cl. .............................. 429/13; 429/34; 429/39
(58) Field of Classification Search ...................... None
See application file for complete search history.

(56) References Cited

U.S. PATENT DOCUMENTS

| 5,700,595 | A   | * | 12/1997 | Reiser ......................... 429/13 |
| 6,187,466 | B1  | * | 2/2001  | Schroll et al. ................. 429/34 |
| 6,673,481 | B1  |   | 1/2004  | Reiser et al. |
| 6,986,958 | B2  | * | 1/2006  | Reiser et al. .................. 429/13 |

* cited by examiner

*Primary Examiner*—John S Maples
(74) *Attorney, Agent, or Firm*—M. P. Williams

(57) ABSTRACT

A fuel cell power plant (19, 19a) has a plurality of fuel cells (70, 70a, 70c) arranged in a stack (20, 20c), each fuel cell having porous, at least partially hydrophilic water transport plates (75, 81) with fuel (74) and oxidant (82) reactant gas channels, there being water channels (78, 85, 78a, 85a, 78c, 85c) exchanging water with the water transport plates. On shut down, water is retained in the water channels and water transport plates by means of either a micro vacuum pump (46), one or two valves (89, 90, 118, 120), a check valve (95, 99), capillary force in the water channels to prevent water from entering the reactant channels which, if frozen, could block flow of reactant gas upon startup.

14 Claims, 10 Drawing Sheets

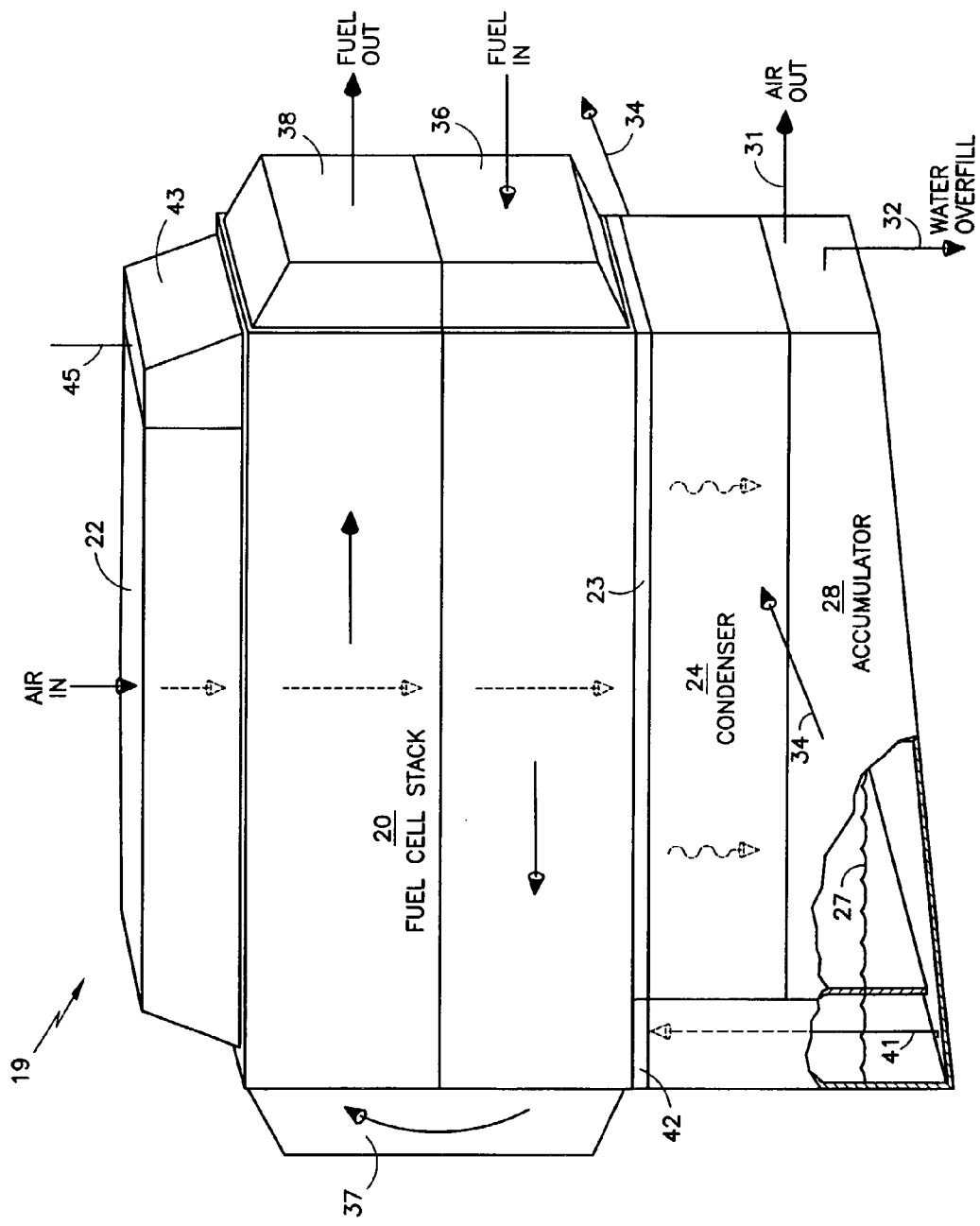

RETAINING WATER IN A FUEL CELL STACK FOR COOLING AND HUMIDIFICATION DURING FROZEN STARTUP

This application is based on PCT/US05/13040, filed 15 Apr. 2005, having a 371 (c) date of 15 Oct. 2007.

TECHNICAL FIELD

This invention relates to fuel cell power plants, such as PEM fuel cell power plants, in which water is retained in the water channels, or other water conduits adjacent to porous, at least partly hydrophilic water transport plates, and in water manifolds interconnected therewith, without allowing water to "droop" into the reactant flow fields or reactant manifolds, thereby to provide both cooling and humidification during a frozen startup without blocking flow of reactant gases to the electrodes.

BACKGROUND ART

Fuel cell power plants that provide electricity to the propulsion system of electric vehicles must be operable at temperatures below that at which water will freeze. Traditional methods of operating fuel cells shut down in environments which may reach freezing temperatures involve draining all the water out of the fuel cell into a reservoir of some sort. Before trying to establish subsequent operation, water must be melted before it can be moved back into the fuel cell, which has been reported to take anywhere from ten minutes to thirty minutes. That much of a delay is generally thought to be intolerable in vehicles, which are thought to require at least partial mobility within a few seconds of a start command, such as the turning of a key.

In U.S. patent application Ser. No. 10/763,793, filed Jan. 22, 2004, the electrode support plate substrates of fuel cells are only partially filled with water when the fuel cell is shut down in an environment which may experience subfreezing temperatures, thereby providing water adjacent the membrane to humidify it in the early stages of a bootstrap startup. The heat from the process melts water substantially instantaneously upon application of reactants to the fuel cells. Filling the substrates only partially, rather than totally, allows the passage of reactant gases through the substrates. The heat of fusion and the latent sensible heat of the water in the substrates assist in cooling the fuel cells during the time before the coolant system is sufficiently thawed to be operative after startup. The partial filling of the substrates, such as about 70% full, is achieved by controlling the pressure differential at shutdown between the water and the reactant gases to be on the order of 5 kPa-6 kPa (0.72 psi-0.87 psi), or by causing the substrates to be partially hydrophilic and partially hydrophobic, in a substantially uniform manner throughout the substrate.

In U.S. Pat. No. 6,673,481, the electrical output of the fuel cell is applied to a load, such as a vehicle propulsion system, within about 20 seconds of applying reactants to the fuel cells or when open circuit voltage across the stack is detected. However, when the fuel cell stack is in an environment which may reach temperatures below the freezing temperature of water, the water in the reactant channels, coolant channels, water pump and other conduits of the water circulatory system is drained upon shutdown of the fuel cell system. Water buildup in the reactant flow fields during startup is avoided by pressurizing the reactant flow fields in the initial phases of startup, which are thereafter being allowed to obtain atmospheric or near atmospheric pressures.

DISCLOSURE OF INVENTION

Objects of the invention include: providing water within fuel cells during startup after the fuel cells have reached a temperature below the freezing temperature of water, without requiring special substrates or special shutdown procedures; improved initial humidification and cooling of frozen fuel cells upon startup; providing water to assist in startup of a frozen fuel cell without ice blocking of the reactant gas flow channels; and improved operation of fuel cells so as to facilitate startup at subfreezing temperatures.

As used herein, the term "water channels" includes open channels formed by grooves in the water transport plates, wicking, porous layers, or other liquid water conducting media, and may include water manifolds.

According to the present invention, upon shut-down of a fuel cell stack, in which each fuel cell includes porous, at least partially hydrophilic reactant gas flow field plates (referred to herein as "water transport plates"), water is retained in the water channels and the water manifolds connected thereto in a manner that prevents substantially all of the water from "drooping" through the water transport plates into the reactant gas channels; the effect of the invention is providing water for humidification and cooling at start up, without ice blocking the reactant channels, so that reactant gases will have access to the electrode catalysts.

According to the invention, water may be caused to remain in the water channels and manifold by capillary pressure, which is controlled by selection of the cross sectional area of the channels, the size of pores if a porous medium utilized instead of channels, or the effective cross sectional flow area of wicking or woven substances should such be used. According to the invention, the capillary rise in round water tubes or pores as a function of the radius of the tubes or pores, can be calculated and thereafter determined from equations, graphs or tables. According further to the invention, the capillary rise of water within porous or woven wicking or water conducting media of any sort is readily determined empirically.

According to the invention, water may be retained in the water channels of the fuel cell stack during shutdown by means of a micro vacuum pump, such as the type used in small residential fish tanks; the water may be retained in the stack by valves, after which a micro vacuum pump may be shut off; the water may be retained in the stack by means of check valves, including a passive check valve composed of a hydrophobic diaphragm with a freeze proof hydrophobic fluid on top of the layer diaphragm.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 9 is a simplified, stylized perspective view of a portion of a fuel cell power plant incorporating the present invention employing a vent to facilitate capillary filling of water channels.

MODE(S) FOR CARRYING OUT THE INVENTION

Figure 1:
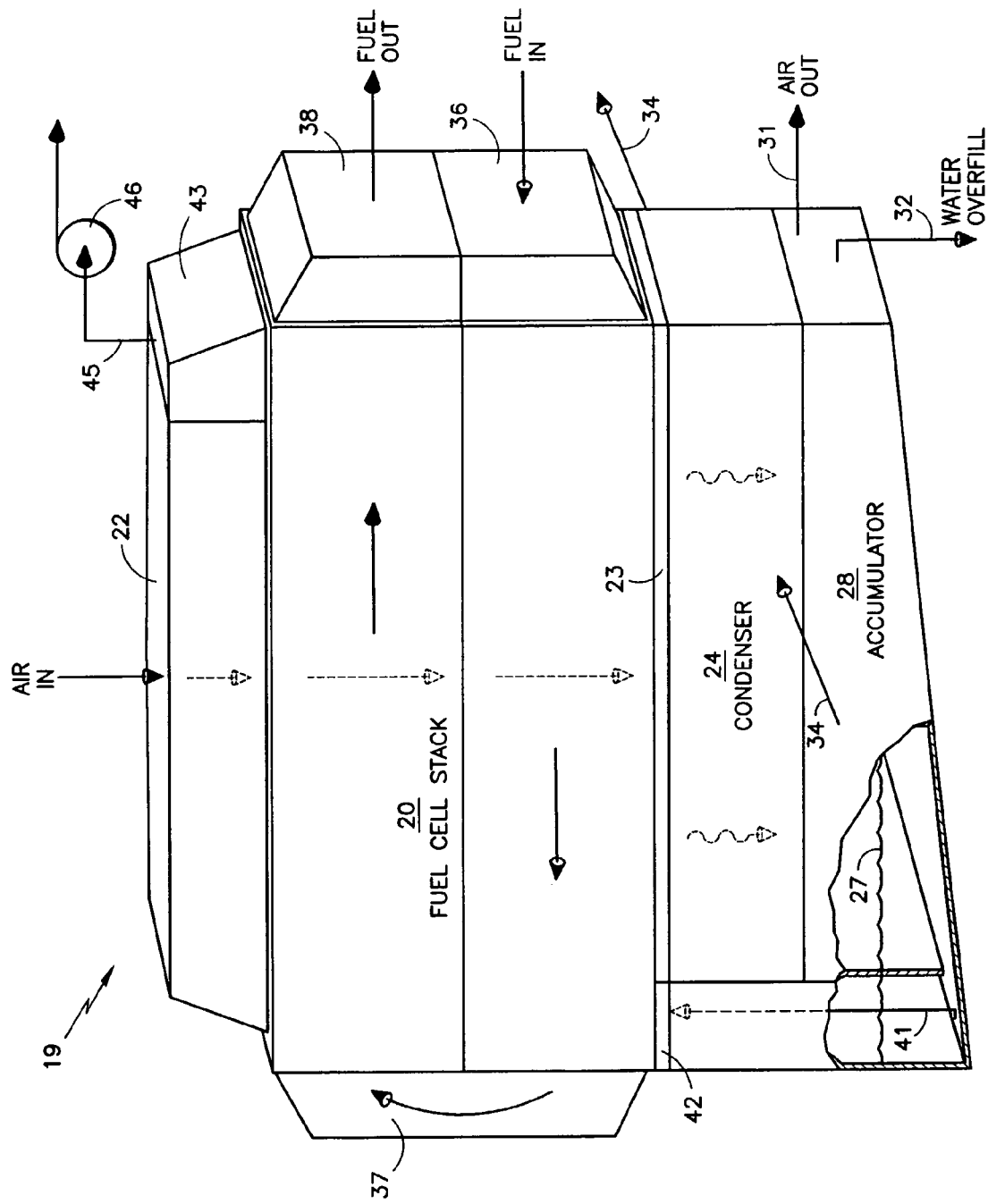
FIG. 1 is a simplified, stylized perspective view of a portion of a fuel cell power plant incorporating the present invention employing a micro vacuum pump.

FIG. 1 illustrates a portion of a fuel cell power plant 19 including a fuel cell stack 20. Air is provided to an air inlet manifold 22 and proceeds through the oxidant flow channels to an air exit manifold 23 and thence into a condenser 24. The outflow from the condenser 24 is above the water line 27 of a water accumulator 28. The cool dry air is expelled at an air outlet 31 which may also comprise, or otherwise be adjacent to, a water overfill 32. The coolant for the condenser 24 may comprise ambient air as illustrated by arrows 34. The condenser 24 may serve as a manifold, and the air inlet manifold 23 may then be omitted.

Fuel provided to a fuel air inlet manifold 36 flows to the left, then through a fuel turn manifold 37, after which it flows to the right and out through a fuel exit manifold 38.

Water from the accumulator 28 flows through a water conduit 41 to a lower water manifold 42. The water passes into water channels (as described with respect to FIGS. 2 and 3 hereinafter) to the top of the fuel cell stack, and possibly into an upper water manifold 43.

The embodiment of FIG. 1 is one which employs evaporative cooling, with no water flowing out of the upper water manifold 43. The only water entering through the lower water manifold 42 is to replace that which is evaporated into the air channels, as described with respect to FIGS. 2 and 3 hereinafter. A conduit 45 provides a fluid communication to a micro vacuum pump 46, which does not conduct any liquid from the manifold 43, but simply applies sufficient vacuum pressure to ensure that water will rise through all the water channels in the stack to the top of the stack. The micro vacuum pump 46 may, for instance, comprise a simple pump of the type used on small residential aquariums, costing only a few U.S. dollars.

Figure 2:
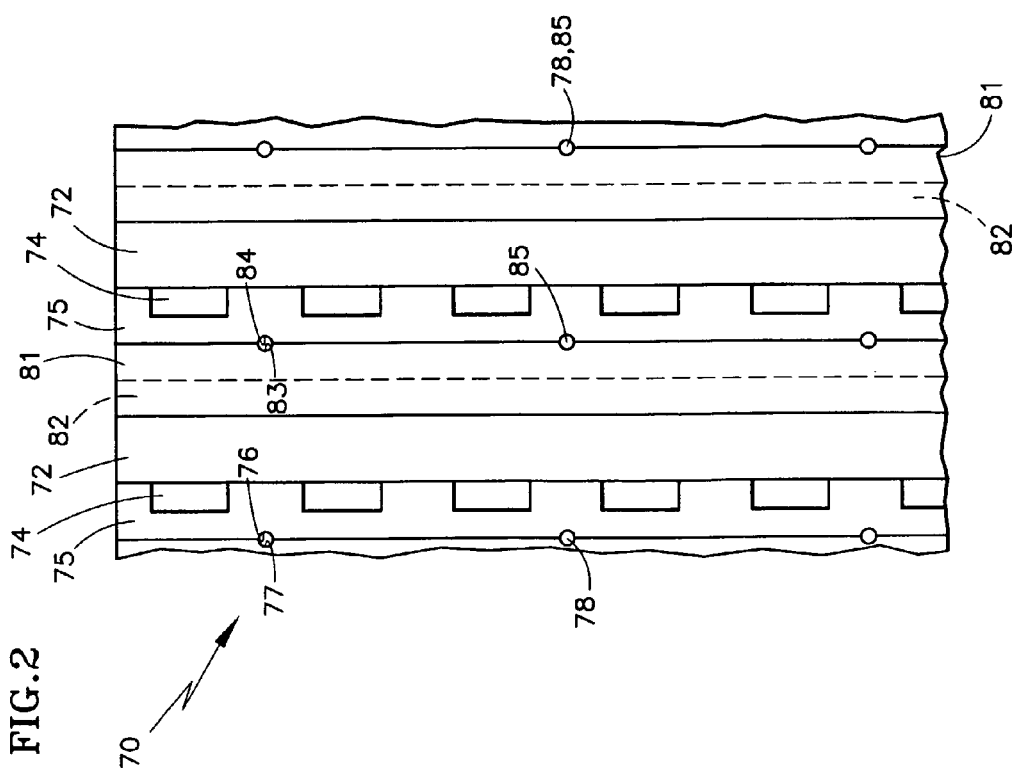
FIG. 2 is a partial, side elevation view of fuel cells which may be employed in the embodiment of FIG. 1.

In one embodiment of the invention illustrated in FIG. 2, the stack 20 includes fuel cells 70, each of which comprises a conventional unitized electrode assembly (UEA) 72, which includes an electrolyte with anode and cathode catalyst layers on opposite sides thereof and gas diffusion layers adjacent the catalysts.

In the embodiment of FIG. 2, fuel reactant gas flows through channels 74 in a hydrophilic porous substrate 75, which in this embodiment includes grooves 76, which together with grooves 77 of an adjacent fuel cell, form minute water channels 78. On the cathode side, an oxidant reactant gas flow field plate 81 includes air flow channels 82 and grooves 83 which, with grooves 84 on an adjacent fuel cell, together form minute water channels 85.

To prevent flooding, it is preferable that the reactant gases be at least a few kP (a fraction of a psi) higher than the pressure of water in the passageways. This will naturally occur during operation of the fuel cell power plant as a consequence of a conventional air pump (not shown) generally causing the air to be that much above atmospheric pressure, and the pressure of the fuel is easily regulated, as is known. In the embodiment of FIG. 2, the water in the channels 78, 85 is at about atmospheric pressure. However, the water could be provided at a pressure other than atmospheric, by a variety of conventional means, provided the reactant gases have a slightly higher pressure as described.

In other embodiments, the water channels may be formed other than by matching grooves as shown. Water channels may be provided by grooves 76, 83 in only one of the reactant gas flow field plates closed off by flat surfaces of an adjacent plate. The invention may be used in fuel cell stacks having separator plates, or if deemed necessary, cooler plates, in which case the coolant flow therein is fully independent of the evaporative cooling of the embodiment of the invention shown in FIGS. 1 and 2.

The reactant gas flow field plates 74, 81 appear to be the same as water transport plates, sometimes referred to as fine pore plates, in a fuel cell power plant which utilizes significant water flow through the water transport plates, with external water processing, as is disclosed in U.S. Pat. No. 5,700,595 and described hereinafter with respect to FIGS. 11 and 12. However, because of the fact that there is about a one hundred-to-one cooling effectiveness per volume of water when evaporative cooling is used, in comparison with the sensible heat, water flow cooling of the aforesaid '595 patent, the water channels in the prior art have cross sections which are up to ten times larger than the cross sections of the water channels 78, 85 of this embodiment. In addition, the spacing of the lateral portions of the water channels 78, 85 (shown at each juncture of the fuel cells in the embodiment of FIG. 2) and similar flow passageways in other embodiments, may be separated by a distance which is several times greater than the spacing between lateral portions of water flow channels in sensible heat, water flow cooling systems, as in the aforesaid patent and FIG. 12. The small cross section of the channels 78, 85, and the large distance between successive lateral portions thereof permit the thickness of the reactant gas flow field plates to be reduced by about one-third.

Figure 3:
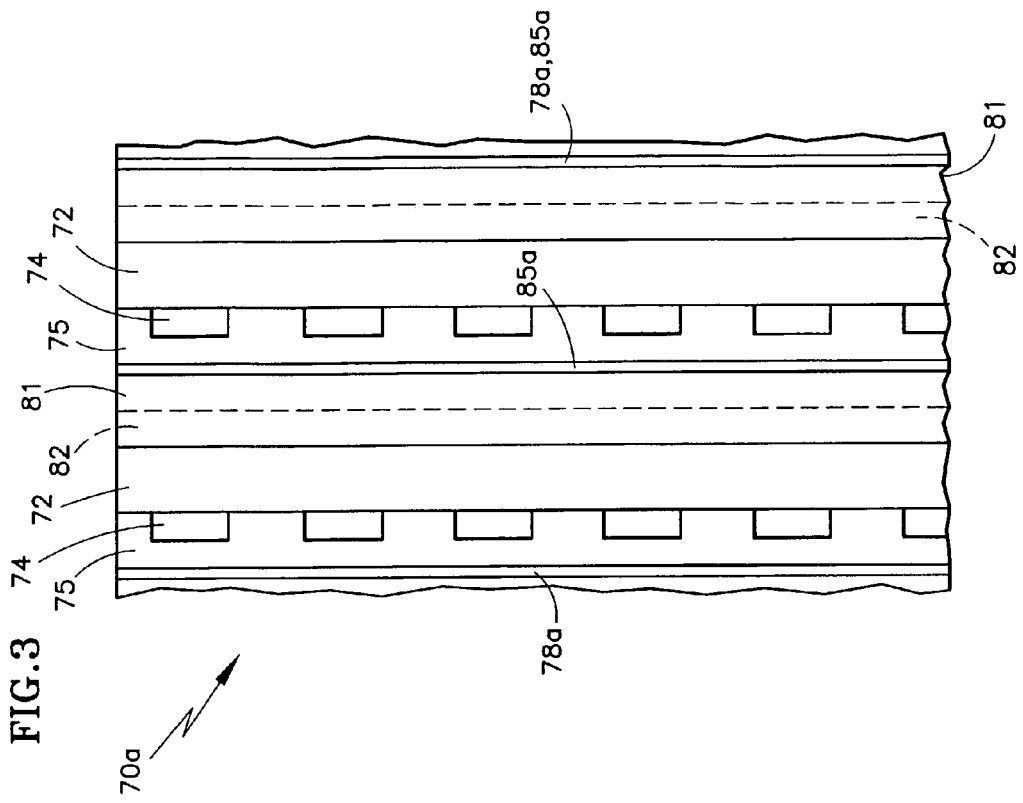
FIG. 3 is a partial, side elevation view of alternative fuel cells which may be used in the embodiment of FIG. 1.

FIG. 3 illustrates fuel cells 70*a* of another embodiment of the invention; in place of grooves forming channels, there is a material 78*a*, 85*a*, which is conductive, hydrophilic and has a high in-plane permeability to water. Such material may be carbon fiber paper, with fibers aligned in the direction of water motion, or it may be other material conventionally used as fuel cell diffusion media, treated conventionally for hydrophilicity as needed. The reactant gas pressure should be higher than the water pressure to avoid flooding, while the pressure (head) of water can be whatever is reasonably necessary to assure replenishment.

The fuel cell stack 20 may employ fuel cells having both groove and non-groove water channels.

In the embodiment of FIGS. 1-3, when the fuel cell power plant is operating, reactant gases are flowing in the reactant gas channels 74, 82 and there is no water. There will be water in the water transport plates 75, 81, migrating toward the oxidant reactant gas flow fields 82 of the cathodes. As the fuel cell power plant is shut down, the small vacuum provided by the micro vacuum pump 46 holds the water in the water channels, as the reactant gases cease to flow. Substantially all of the water will be retained in the water channels, the water manifolds and the water transport plates. There will be no significant liquid water in the reactant flow field channels, so that there will be an insignificant amount of ice in the reactant channels, should the temperature fall below the freezing temperature of water. The term "insignificant" means an amount of ice that will not impede reactant gas flow to an extent that will affect power or performance of the fuel cell power plant. The term "significant" means an amount of water which will result in more than an insignificant amount of ice in the reactant channels should the temperature fall below freezing.

In the embodiment of FIGS. 1-3, the micro vacuum pump 46 may be operative throughout the period of time that the fuel cell power plant is not operational. The small vacuum retains the water in the water channels, and any water within the water transport plates, without allowing the water to droop into the reactant flow fields. Therefore, there will be no ice should the temperature fall below the freezing point of water, and the reactant channels will remain open so that reactant gases can reach the electrode catalysts upon startup.

Figure 4:
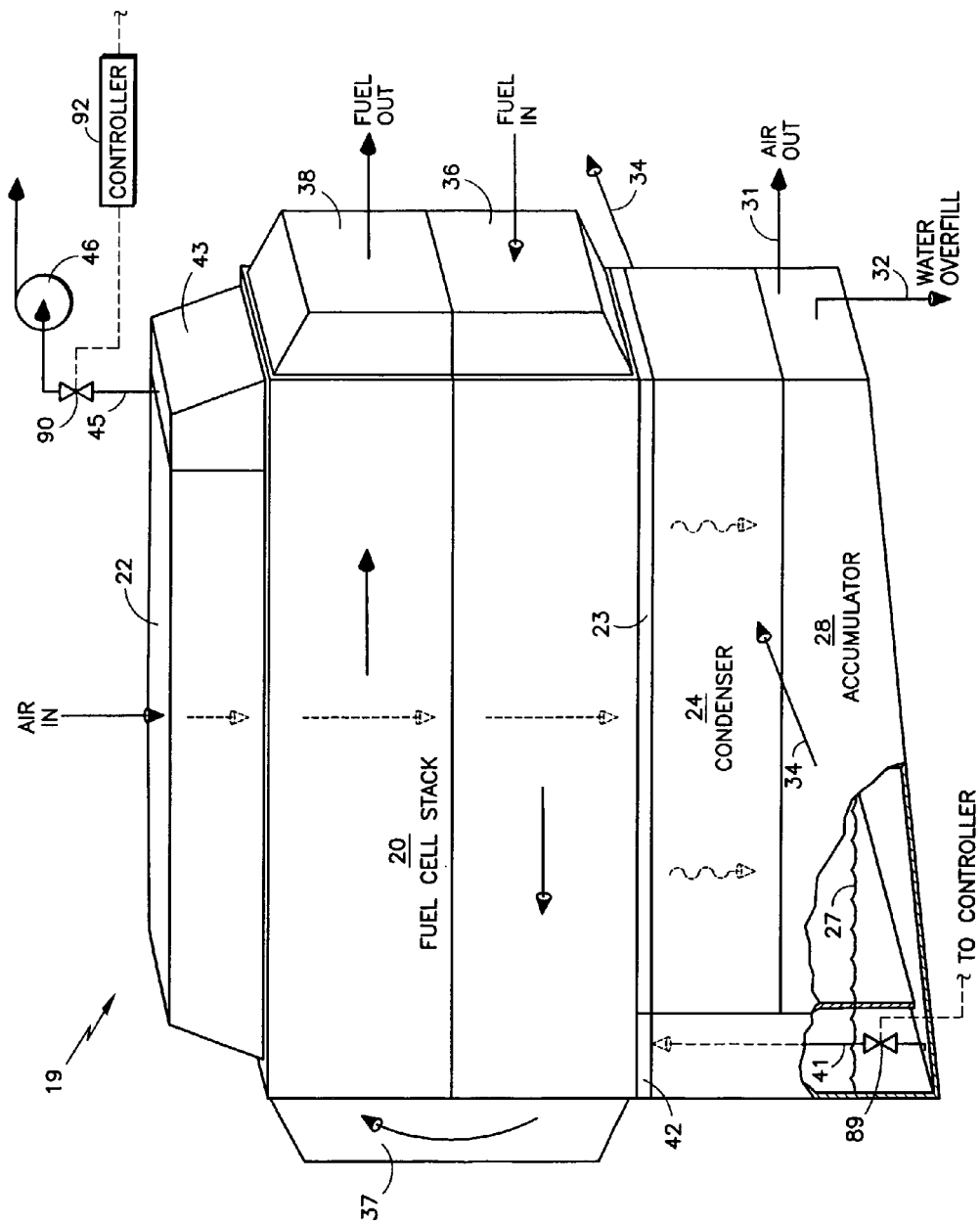
FIG. 4 is a simplified, stylized perspective view of a portion of a fuel cell power plant incorporating the present invention employing two controlled valves.

In FIG. 4, an embodiment of the invention allows the micro vacuum pump to be off during inoperational periods of the fuel cell stack. In FIG. 4, there is a valve 89 in the conduit 41 leading from below water level in the accumulator 28 to the lower water manifold 42, and a valve 90 in the conduit 45 leading from the upper water manifold 43 to the micro vacuum pump 46. Upon shutdown, the vacuum pump remains on until a controller 92 closes the valve 89 and then the valve 90; and then the micro vacuum pump 46 is turned off. The valves prevent motion of the water, thereby preventing the water in the water channels 78, 85, 78a, 85a and any water that may be in the water transport plates 75, 81 from drooping into the reactant flow channels 74, 82.

Figure 5:
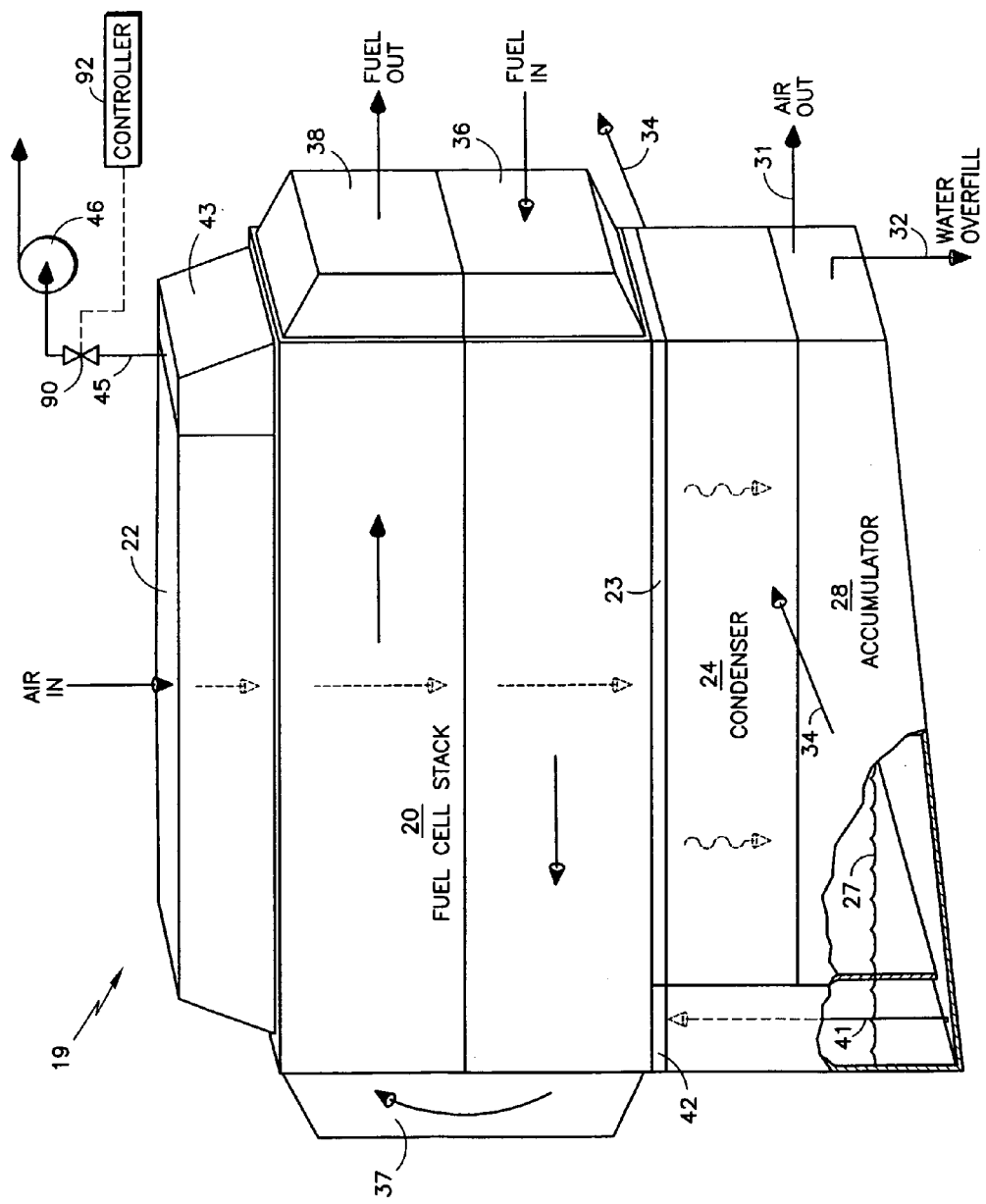
FIG. 5 is a simplified, stylized perspective view of a portion of a fuel cell power plant incorporating the present invention employing a single controlled valve.

As illustrated in FIG. 5, the valve 89 may be omitted if desired. With the valve 90 closed, atmospheric pressure within the accumulator 28 will prevent droop, thereby retaining the water in place and keeping the reactant flow channels clear. Similarly, valve 89 may be retained and valve 90 omitted if desired. Without either valve 89, 90, the micro vacuum pump 46 would be left running while the fuel cell stack is shut down. As an alternative, the valve 90 may be omitted and the valve 90 used alone.

Figure 6:
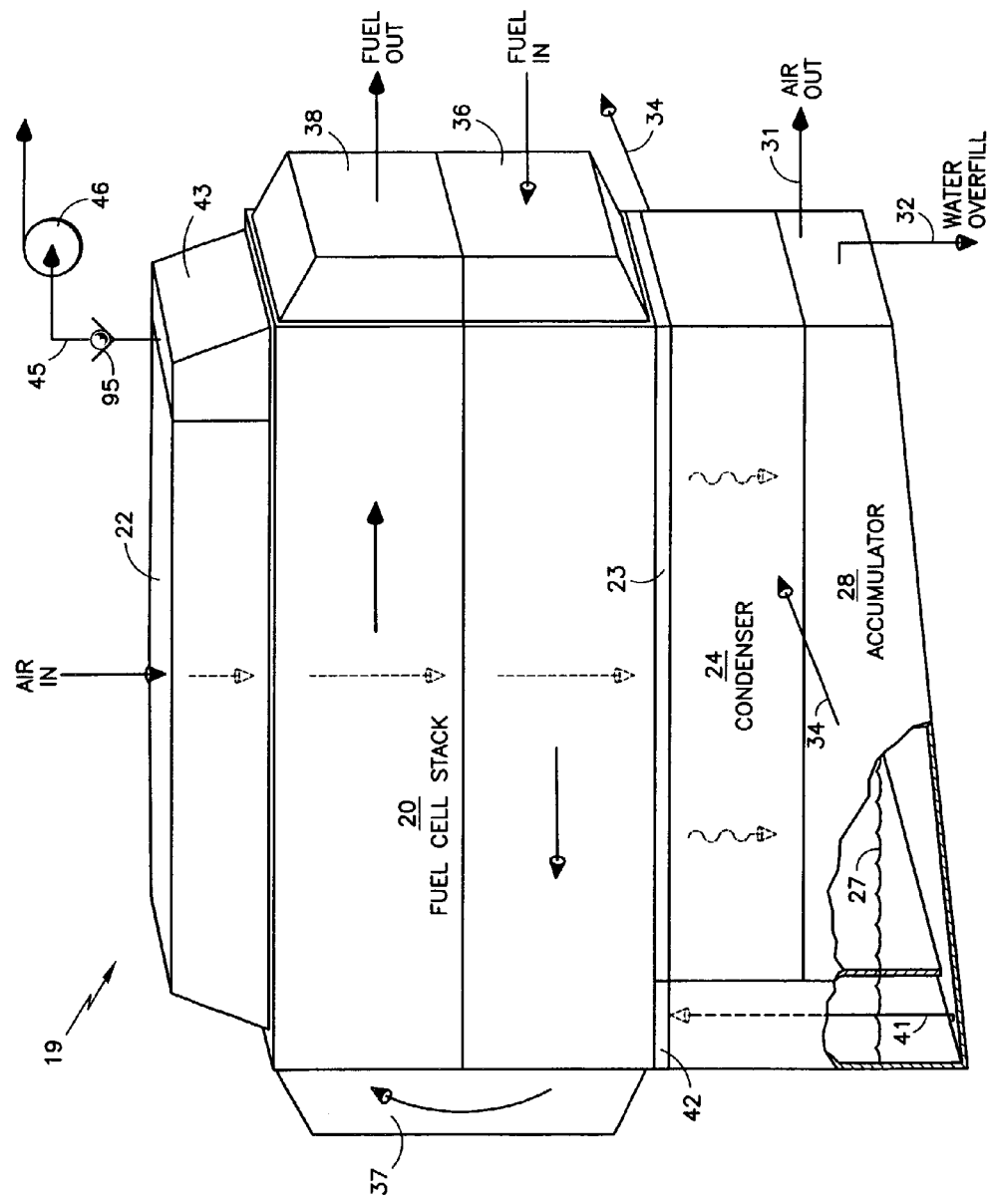
FIG. 6 is a simplified, stylized perspective view of a portion of a fuel cell power plant incorporating the present invention employing a check valve.

FIG. 6 illustrates that a check valve 95 may be used in place of the dynamically controlled valve 90 of FIG. 5. Thus, when the micro vacuum pump 46 is operating, the check valve 95 will open as necessary to remove gas from the water channels (and/or the upper water manifold 43), but when the fuel cell power plant is shut down, the micro vacuum pump 46 may be shut off and the check valve 95 will prevent all but an insignificant amount of water from drooping through the water transport plates into the reactant gas flow fields. The check valve 95 may be a conventional, mechanical check valve, or it may take the form described with respect to FIGS. 7 and 8.

Figure 8:
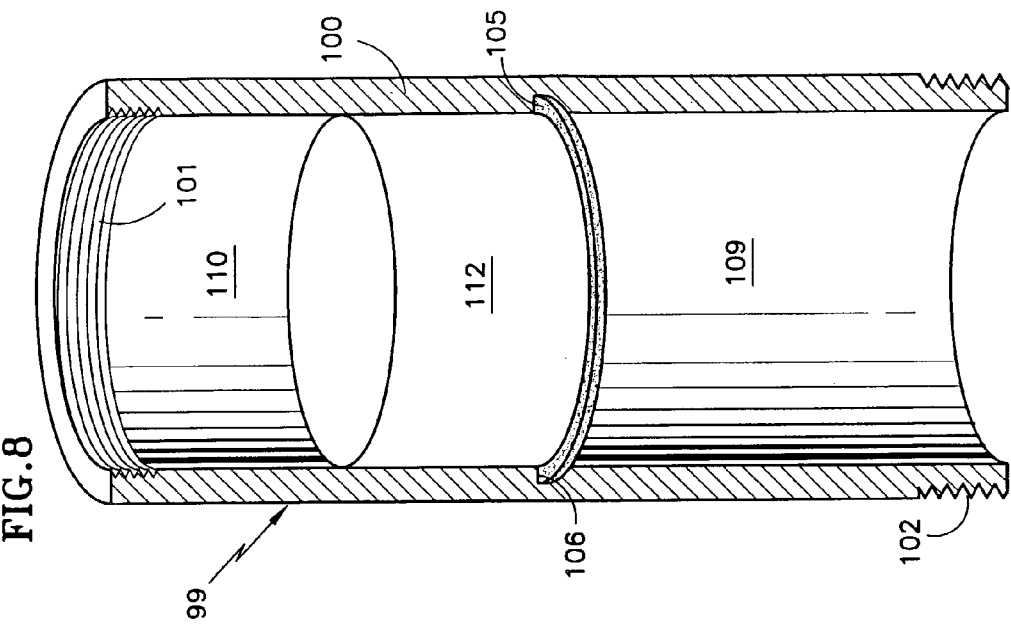
FIG. 8 is a partial, sectioned perspective view of the check valve of FIG. 7.
Figure 7:
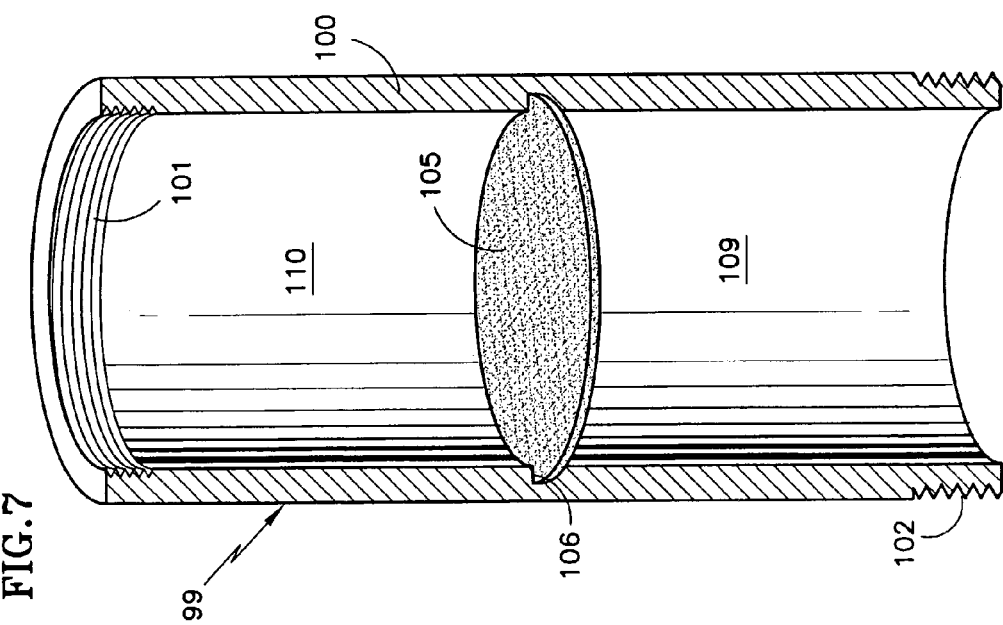
FIG. 7 is a sectioned perspective view of a portion of a fluidic check valve which may be used in the embodiment of FIG. 6.

For clarity, a fluidic check valve 99 is first shown in FIG. 7 without the hydrophobic liquid therein, and then shown in FIG. 8 with the hydrophobic liquid therein. In FIG. 7, the hydrophobic fluidic check valve 99 is illustrated as being formed within a casing 100 having threads 101, 102, of a conventional sort. A hydrophobic diaphragm, such as a porous polytetrafluoroethylene (PTFE) diaphragm 105 is disposed within a groove 106 in the casing 100. Being hydrophobic, the diaphragm 105 prevents any water in a chamber 109 below the diaphragm from passing through the diaphragm into a chamber 110 above the diaphragm. Therefore, when used as a check valve 95 as in the embodiment of FIG. 6, no water will pass through to the micro vacuum pump 46. But gas will flow upwardly through the diaphragm 105 to vent the water channels.

To form a check valve, such that gas can pass upwardly but not downwardly through the casing 100, a hydrophobic fluid, and preferably a hydrophobic fluid which will not freeze above about −60° C. (−27° F.), such as PEG-400, is disposed within the casing 100 above the diaphragm 105 as is illustrated in FIG. 8. Whenever a gas or vapor is under pressure in the chamber 109, such as may occur if there is upward pressure on the water in the channels within the stack, or as a consequence of the micro vacuum pump 46 providing a slight vacuum in the chamber 110, the air or other vapor or gas will pass up through the diaphragm 105 and will be simply buoyed upwardly through the medium 112. On the other hand, a gas or vapor in the chamber 110 above the medium 112, which is at a higher pressure than the pressure within the chamber 109, will simply push the medium 112 through the diaphragm 105 if the pressure is sufficiently great. However, the pressure differentials in the embodiment of FIG. 6 are sufficiently small, less than about 20 kPa (3 psi) so that the hydrophobic medium 112 will not be forced through the diaphragm 105.

Another embodiment of the invention is illustrated in FIG. 9. In this embodiment, the upper coolant manifold 43 is simply vented to atmosphere, which can be achieved by allowing the upper end of the conduit 45 to be open to the ambient. In the embodiment of FIG. 9, the pressure necessary to ensure that the water which is evaporated will be replenished all the way to the top of the stack is provided by the above-atmospheric air pressure in the accumulator while the fuel cell power plant 19 is in operation. When the power plant shuts down, maintaining the water within the water channels, even though there is no above-atmospheric pressure in the accumulator, is achieved by choosing the pore size (or equivalent flow parameters) of the water channels to achieve a capillary pressure sufficient to balance the head of the water when it is at least one-third of the height of the stack, and preferably at the top of stack (or perhaps slightly into an upper water manifold, such as the manifold 43 with the inclusion of a porous body (such as a sponge)).

Figure 10:
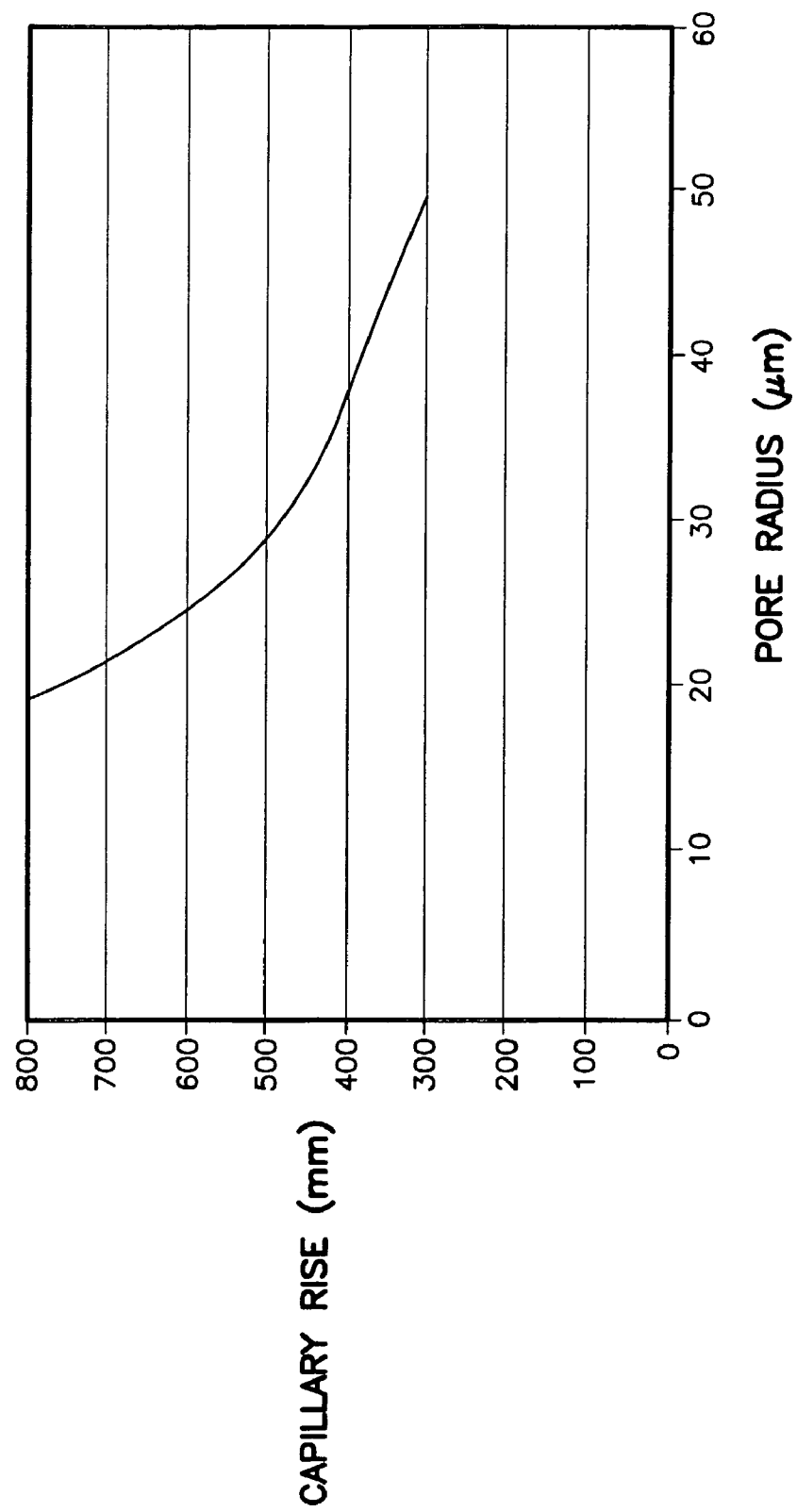
FIG. 10 is a chart illustrating capillary rise as a function of pore radius.

A graph of capillary rise as a function of pore radius is shown in FIG. 10. The water channels may not be grooves in the water transport plates, but rather some other form of water conducting medium, such as the plates 78a, 85a described hereinbefore. In order to assure capillary pressure sufficient for water to reach the top of the stack, the density and size of fibers that define the interstitial spacing of carbon fiber paper, or the characteristic of any other media which may be used as water channels, can readily be determined empirically by a minimal amount of testing of material having various characteristics. In either case, the rise of water as a function of capillary pressure should be sufficient to ensure water at the top of the stack.

Figure 11:
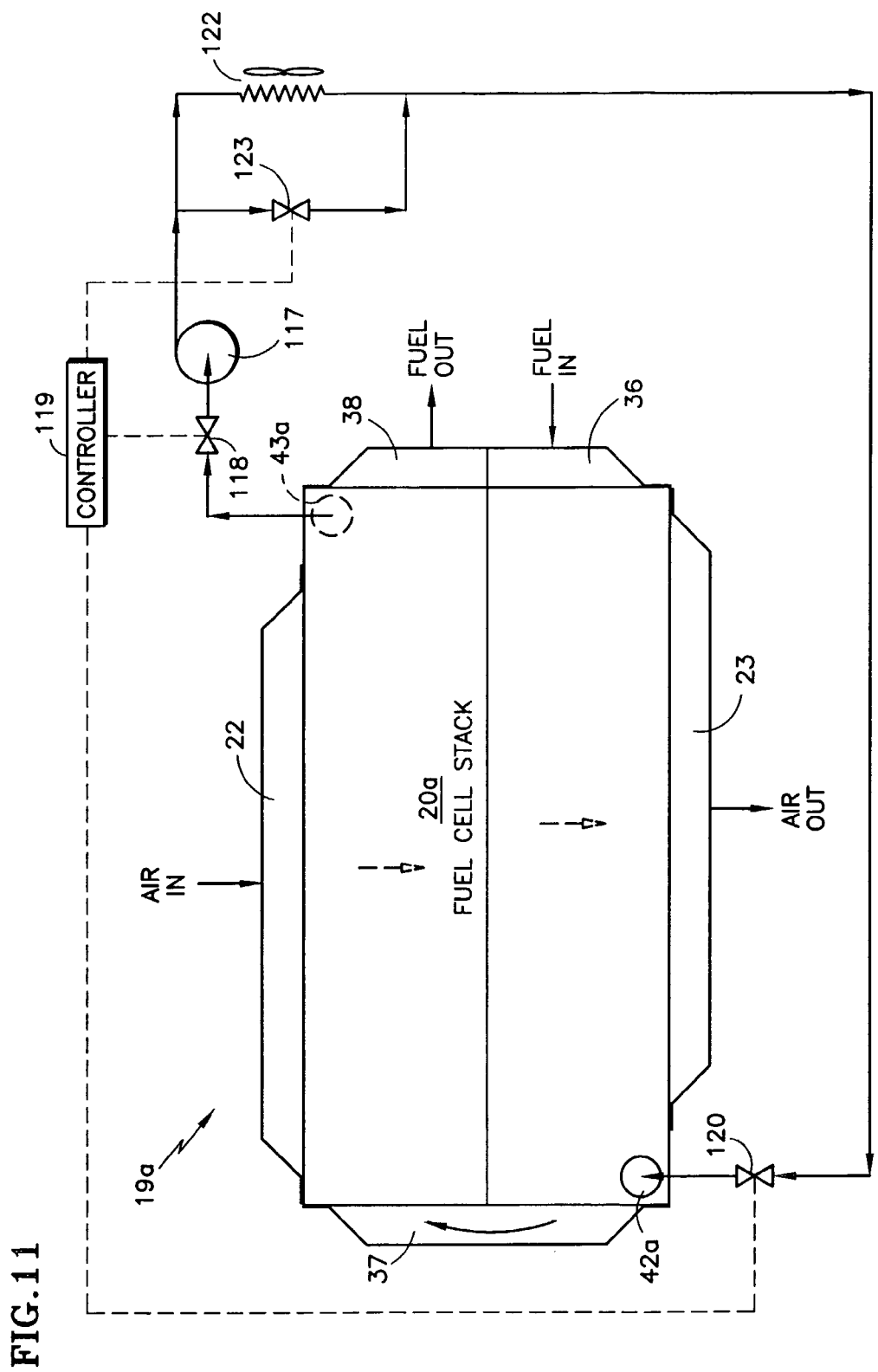
FIG. 11 is a simplified, stylized side elevation view of a portion of a fuel cell power plant having total water management and employing the present invention.
Figure 12:
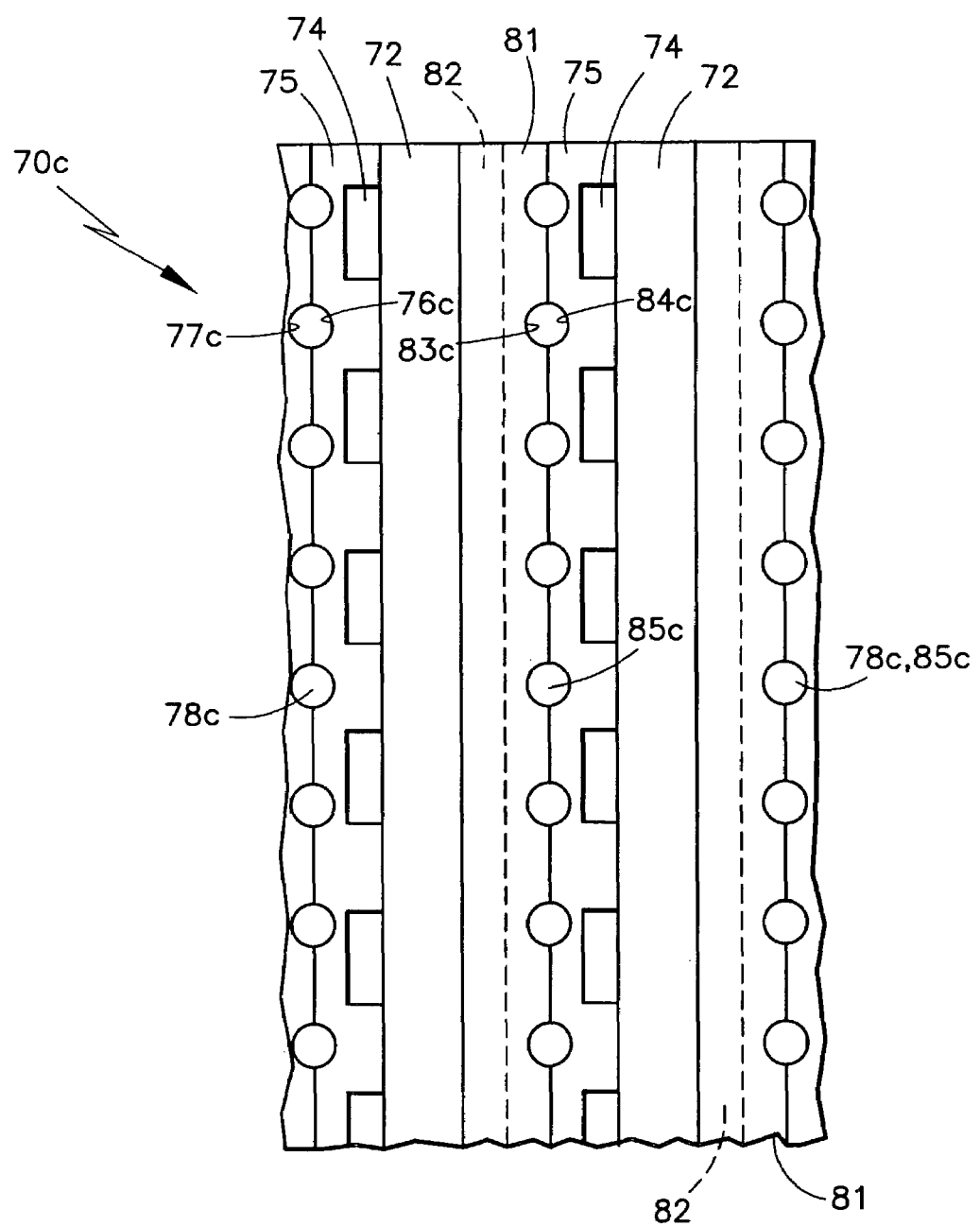
FIG. 12 is a partial, side elevation view of fuel cells which may be employed in the embodiment of FIG. 10.

Another embodiment of the invention is illustrated in FIGS. 11 and 12. In FIG. 11, a fuel cell power plant 19a includes a fuel cell stack 20a having large, closely spaced water channels, as described hereinafter with respect to FIG. 12, and external water components, to provide a total water management system. In FIG. 11, water is drawn by a pump 117 through a valve 118 that is adjusted by a controller 119. The water is drawn through an upper (or exit) water channel 43a, through all the water channels of the fuel cells in the stack 20a from a lower (or entrance) water manifold 42a. A valve 120, adjustable by the controller 119 provides a restriction that causes, when the fuel cell power plant is operating, the pressure of the water within the fuel cell stack to be lower than the pressure of reactant gases (which is generally near ambient).

Water flowing from the pump 117 may pass through a heat exchanger 122 to be cooled, or it may be bypassed through a controller operated valve 123, as is necessary to set the proper temperature of water circulating back to the stack.

In accordance with the invention, upon shutdown, valve 120 and then the valve 118 will be closed a very short time before the pump 117 is turned off. This retains the water within the water channels as described hereinbefore, without droop into the reactant gas flow fields.

FIG. 12 illustrates fuel cells 70c which may be used in the embodiment of FIG. 11. The difference between these fuel cells and those described with respect to FIG. 2 is that the grooves 76c, 77c, 83c, 84c that form the water channels 78c, 85c are much larger and closer together, thereby to provide significant flow of water through the fuel cells. In this embodiment, it is simply the latent sensible heat of the water itself that transfers heat from the stack 20a to the heat exchanger 122, as necessary to cool the stack, as in the aforementioned '595 patent.

The operation is similar to that described with respect to FIGS. 1 and 2: when the fuel cell power plant 19a is operational, water is circulated through the stack 20a by the pump 117. When the power plant 19a is shut down, the valves 118 and 120 hold the water within the water channels 78c, 85c and prevent droop into the reactant flow fields 74, 82.

A twenty-cell stack of the type described with respect to FIGS. 11 and 12 was shut down, with water held in the coolant channels 78c, 85c according to the invention, cooled to –20° C. without any leakage and with no damage.

The term "operative upon shutdown" does not exclude operation also when the fuel cell power plant is not shut down, such as is the case of the micro vacuum pump (if left on) or capillary pressure (which is always present).

The term "bulk water" refers to the condition where the amount of water in a channel is such that it will not inhibit the flow of sufficient gas to sustain fuel cell operation.

The invention claimed is:

1. A fuel cell power plant (19) comprising:
   a plurality of fuel cells (70, 70a, 70c) arranged in a stack (20), each fuel cell including a unitized electrode assembly (72) having a proton exchange, polymer electrolyte membrane disposed between catalysts of an anode and a cathode which each have a gas diffusion layer, a porous, at least partly hydrophilic anode water transport plate (75) with fuel reactant gas flow channels (74) adjacent the anode gas diffusion layer, and a porous, at least partly hydrophilic cathode water transport plate (81) with oxidant reactant gas flow channels (82) adjacent the cathode gas diffusion layer;
   a plurality of water channels disposed between said anode water transport plate and said cathode water transport plate of adjacent fuel cells;
   means providing water to said water channels when said fuel cell power plant is operating, said water transferring between said water channels and said water transfer plates;
   characterized by:
   means configured so that water is retained in said water channels and said water transport plates when said fuel cell power plant is inoperative.

2. A fuel cell power plant according to claim 1 wherein: said water channels are vented.

3. A fuel cell power plant according to claim 2 wherein: said water channels are vented at the top of the stack.

4. A fuel cell power plant according to claim 2 further comprising a micro vacuum pump connected to said vent and providing just sufficient vacuum to cause water to rise to the top of said stack without flow through said pump.

5. A fuel cell power plant according to claim 4 wherein said pump is operative when said fuel cell power plant is operating as well as when said fuel cell power plant is shut down, thereby to retain water in said water channels during shutdown.

6. A fuel cell power plant according to claim 2 wherein there is a valve at either the top or the bottom of said water channels or at both the top and the bottom of said water channels.

7. A fuel cell power plant according to claim 2 wherein said water channels are vented through a check valve.

8. A fuel cell power plant according to claim 7 wherein said check valve comprises a hydrophobic diaphragm with a hydrophobic fluid disposed above said diaphragm.

9. A fuel cell power plant according to claim 8 wherein said hydrophobic fluid does not freeze above about –50° C.

10. A fuel cell power plant according to claim 2 wherein the characteristics of water channels are chosen to provide capillary rise of water to at least one-third of the height of the stack when said fuel cell power plant is not operating.

11. A method of operating a fuel cell power plant (19) said fuel cell power plant comprising a plurality of fuel cells (70, 70a, 70c) arranged in a stack (20), each fuel cell including a unitized electrode assembly (72) having a proton exchange, polymer electrolyte membrane disposed between catalyst layers of an anode and a cathode which each have a gas diffusion layer, a porous, at least partly hydrophilic anode water transport plate (75) with fuel reactant gas flow channels (74) adjacent the anode gas diffusion layer, and a porous, at least partly hydrophilic cathode water transport plate (81) with oxidant reactant gas flow channels (82) adjacent the cathode gas diffusion layer, them being a plurality of water channels disposed between said anode water transport plates and said cathode water transport plates of adjacent fuel cells; said method comprising:
   providing water to said water channels when said fuel cell power plant is operating, said water transferring between said water channels and said water transfer plates;
   characterized by:
   retaining water in said water channels and said water transport plates when said fuel cell power plant is inoperative.

12. A method according to claim 11 wherein:
   said step of retaining comprises:
   upon shutdown of said fuel cell power plant, blocking either the upper end of said water channels, the lower end of said water channels or both.

13. A method according to claim 11 wherein:
   said step of retaining comprises selecting the characteristics of said water channels to provide capillary rise of water in said water channels to at least one-third of the height of said stack.

14. A method according to claim 11 wherein:
   said step of retaining comprises applying a negative pressure to said water channels.

* * * * *